Aug. 13, 1968          D. H. CIRANKO            3,397,299
                       WELD HEAD LOCATOR
Filed March 8, 1965                          2 Sheets-Sheet 1

INVENTOR.
Dazo H. Ciranko
BY
Robert E. Fowler
ATTORNEY

Aug. 13, 1968  D. H. CIRANKO  3,397,299
WELD HEAD LOCATOR
Filed March 8, 1965  2 Sheets-Sheet 2
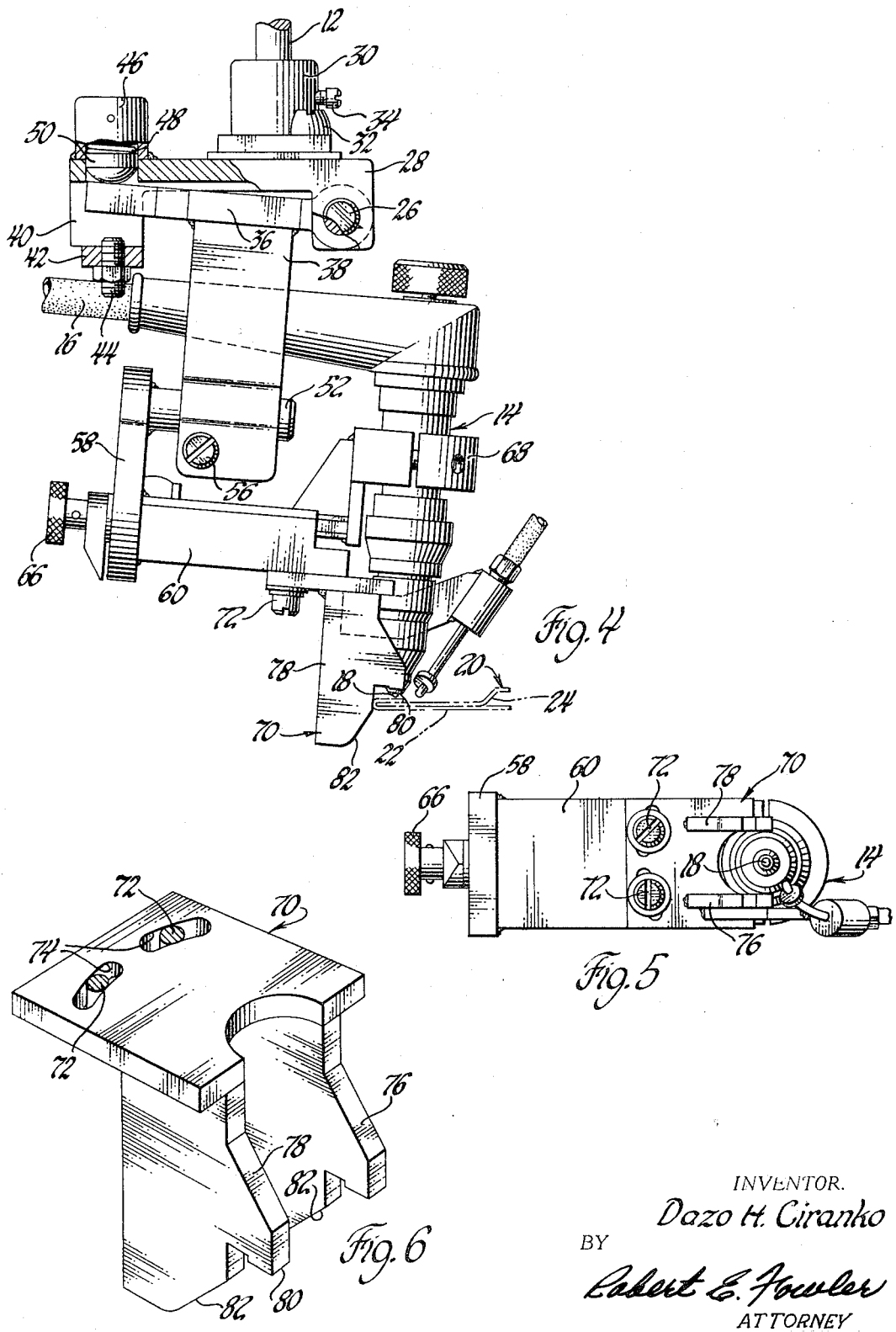
INVENTOR.
Dazo H. Ciranko
BY
Robert E. Fowler
ATTORNEY United States Patent Office
3,397,299
Patented Aug. 13, 1968

3,397,299
WELD HEAD LOCATOR
Dazo H. Ciranko, Grand Rapids, Mich., assignor to General Motors Corporation, Detroit, Mich., a corporation of Delaware
Filed Mar. 8, 1965, Ser. No. 437,780
3 Claims. (Cl. 219—86)

ABSTRACT OF THE DISCLOSURE

A welding gun is connected to a reciprocating cylinder through an articulated support hinged at a first pivot axis and spring biased in one direction. Motor means are secured to a frame and to the support for moving the support and welding gun toward and away from a workpiece. An indexing cam extending beyond the welding gun is adapted to engage the edge of the workpiece to position the welding gun at a predetermined distance from the edge and as permitted by the hinge. The support includes a second pivot axis at right angles to the first pivot axis and a linear slide for adjusting the welding gun position.

---

This invention relates to welding machines and more particularly to indexing means for spot welding machines so that the welding electrode will be brought accurately into contact with the work using the edge of the work itself as a guide.

In the fabrication of many composite subassemblies it is frequently necessary to secure members together by utilizing a row of spot welds spaced from an edge an equal distance at all points. As an example of such a structure, the edge of a door panel in an automobile is cut to the proper shape and then bent over upon itself to clamp the edge of an inside sheet member for assembly. The welds should then be as near the inside edge of the bent over portion as possible for obvious reasons. As the parts of the welder are moved with respect to each other so that a row of spot welds can be formed, accurately locating means are necessary to provide a straight row of welds along the assembly so that it will have a good appearance and prevent loose edges.

It is an object in making this invention to provide automatic guiding means for spot welding machines to provide welds at desired tailored locations.

It is a further object in making this invention to provide automatic locating means for spot welding equipment which uses the work itself as an index.

With these and other objects in view which will become apparent as the specification proceeds, my invention will be best understood by reference to the following specification and claims and the illustrations in the accompanying drawings, in which:

FIG. 4 is a front view similar to FIG. 1 showing the adjustable supporting means in a different position as required by the relative position of the workpiece;

FIG. 5 is a bottom view of the assembly with the workpiece removed; and,

FIG. 6 is an enlarged perspective view of the locating fingers per se.

Figure 1:
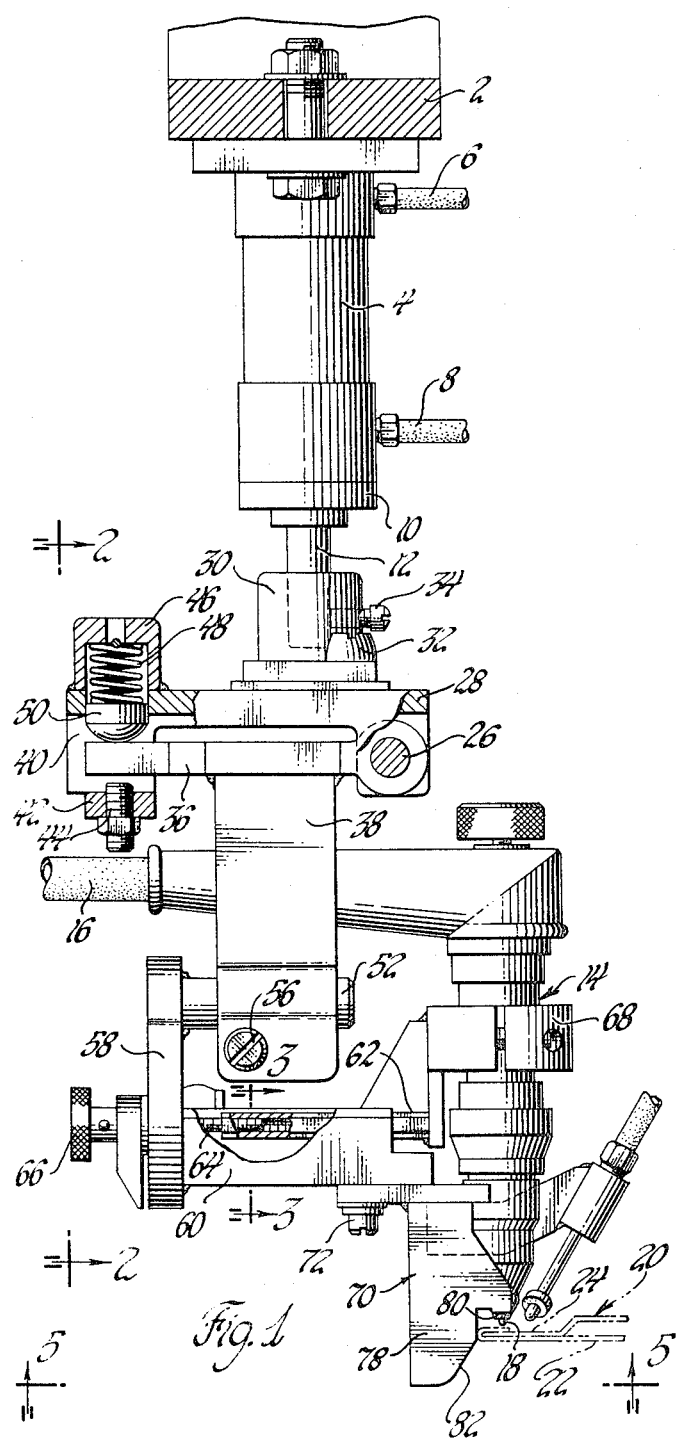
FIGURE 1 is a front view of a spot welder showing the workpiece in place.
Figure 2:
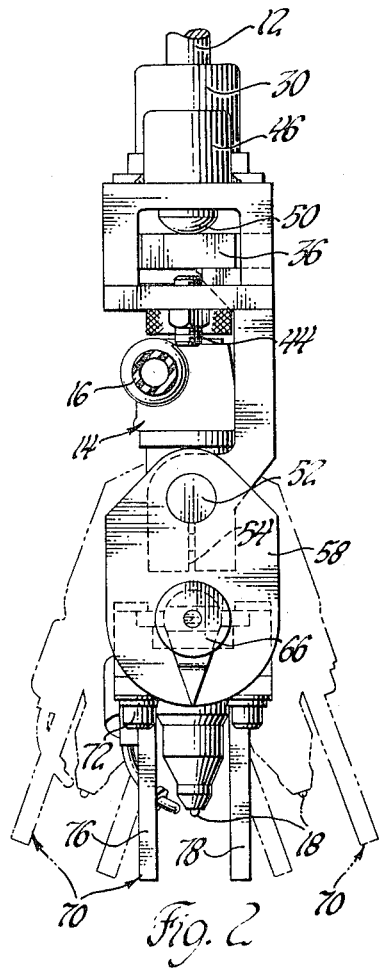
FIG. 2 is a side view of the welder taken on line 2—2 of FIG. 1 showing various possible adjusted positions in dash outline.

Referring now more particularly to the drawings, in FIG. 1 there is shown a welding machine frame 2 which supports an operating cylinder 4 which normally would have clamped thereto the welding head with its electrode, the latter being forced down into contact with the work when the welding machine is operated. The operating cylinder 4 is provided with compressed air through the supply lines 6 and 8. The movable piston 10 supports a shaft 12 which is moved upwardly and downwardly for bringing the welding electrode into engagement with the work. The welding gun shown in general at 14 is adapted to be supported by the shaft 12 so that it can be adjusted and set in various desired positions depending upon the work to be welded. The welding head 14 is supplied by electric power through cable 16 which is coupled to the weld electrode 18 adapted to contact any workpiece, such as that shown in dash and dot lines at 20. This workpiece could be such as that formerly suggested as a door panel in which the main portion of the door 22 is bent over upon itself to clamp the outer edge of an inner panel 24 for final assembly. It is desirable to weld the innermost portion of the bent over section as shown in FIG. 1.

A first pivot point in the mounting assembly is provided by shaft 26 carried on a transverse platform 28 secured to a cylindrical collar 30 by suitable threaded cap screws 32. The collar 30 is in turn fastened to the shaft 12 by any threaded locking means, such as set screw 34. Thus this assembly is carried up and down with the motion of the actuating piston 10. A flat transverse plate 36 having an enlarged end with a central bore which fits over a cross-shaft 26 is carried by the platform 28 and it can rotate thereabout. To its lower surface is welded a vertical member 38 extending down parallel to the welding gun 14. Platform 28 has on its left end as viewed in FIG. 1 a pair of depending side legs 40 which straddle the free end of the member 36. A cross member 42 is secured across the lower ends of the depending side members 40 to complete an enclosure around the end of member 36. An adjustable limit screw 44 is threaded through the central bottom portion of this transverse member 42 and can engage the lower surface of the free end of arm 36 to limit its movement as will be described. A hollow housing 46 is provided on the top of platform 28 and mounted therein is a coil spring 48 adapted to force a contact button 50 into contact with the upper surface of arm 36. By adjusting the set screw 44 the position of the depending arm 38 can be determined and it can be forced in a clockwise direction around shaft 26 against the compression of the spring 24. This provides adjustment about an axis perpendicular to the paper in FIG. 1.

Figure 3:
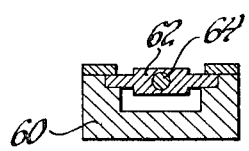
FIG. 3 is a sectional view taken on line 3—3 of FIG. 1.

In order to provide further adjustment about an axis at right angles to the first, the lower end of vertical member 38 is provided with a bore which carries a stub shaft 52, said depending arm 38 also has a slot 54 at one side of the bore and a clamping screw 56 which when tightened locks the stub shaft 52. The stub shaft 52 is welded to a vertical supporting plate 58 which carries a horizontal channel support 60. This horizontal support is U-shaped in cross-section as best shown in FIG. 3 and carries an adjustable slide 62 which can move longitudinally therein. In order to produce such motion the center of the slide 62 is bored out and threaded to receive a threaded shaft 64 which extends into one end thereof and thence out through a threaded opening in plate 58 to a control knob 66 on the left and as shown in FIG. 1. This slide acts as a mount for a collar supporting member 68 which clamps around the center of the weld gun 14 and holds the same. By rotating the knob 66 the welding gun can be moved small distances back and forth for close adjustment.

It will be seen that the supporting means for the gun provides flexibility in original setting or adjustment prior to performing a series of welds. If it is required that the welding electrode 18 be brought down into engagement with the upper surface of the clamped over end shown in the assembly 20 a plurality of times as the workpiece is moved along, it is easy to understand that its relative position on the workpiece might change unless some means were provided for assuring electrode position with respect thereto. There is, therefore, provided an indexing member 70 shown in perspective in FIG. 6. This indexing member is adapted to be carried on the lower surface of the member 60 and is secured thereto by cap screws 72 which extend through slots 74. By providing such slots an amount of adjustability around the axis of the gun may be obtained. The member 70 has a pair of spaced side sections 76 and 78 which extend forwardly around the gun so that their lower ends 80 are substantially on diametrically opposite sides of the welding electrode 18 when in position. The cam surfaces 82 are adapted to engage the edge of the workpiece as the welding gun is brought down into welding position by operation of the cylinder 4 causing the gun to move to the left and when the electrode 18 engages the upper surface of the workpiece to be properly placed or located with respect to the work.

In operation the workpiece is first laid on the platen of the welder and various adjustments are made at the points indicated so that when it is in its retracted position, the welding electrode is above and slightly to the right of the position shown in FIG. 1. This can be accomplished by movement around any of the described axes or longitudinal movement sideways by rotation of the knob 66. As the cylinder 4 is actuated to force out the piston 10 the cam surface 82 on each side should engage the workpiece edge simultaneously forcing the whole assembly around the axis of shaft 26 against the pressure of spring 48 and moving the arm 36 away from limit stop 44 until the workpiece has reached the upper edge of the cam surfaces 82 to the position shown in FIG. 1 which is approximately the point of contact. This will provide a weld at the innermost end of the clamped over section where it is desired. Each time the gun is brought down into contact with the surface the weld is always performed at that distance from the edge due to the use of the indexing arm section 70. The mounting assembly is very flexible and can be tilted as shown in dashed outline if the part is engaged at an angle.

I have, therefore, provided a means for controlling a spot welder so that the welds produced thereby will always be at the same distance from a given index surface.

What is claimed is:

1. In a welding machine the combination of stationary means for supporting a workpiece,
   a frame,
   supporting means,
   a welding gun attached to the supporting means for movement therewith,
   motor means secured to the frame and to the supporting means for moving the supporting means and the welding gun toward and away from the workpiece,
   the supporting means comprising a first portion attached to the motor means, a second portion attached to the welding gun, pivot means interconnecting the portions, resilient means for biasing the second portion about the pivot means, and adjustable stop means opposing the resilient means for limiting the movement of the second portion relative to the first portion,
   the second portion having adjustment means pivotal about an axis at right angles to the axis of the pivot means, and having linear adjustment means including a slide means for carrying the welding gun,
   and means for guiding the welding gun to a predetermined position relative to an edge of the workpiece comprising an indexing member adjustably mounted on the second portion by locking means for rigidly securing the indexing member to the second portion, the indexing member including cam means projecting beyond the end of the workpiece as the welding gun is moved toward the workpiece and for pivoting the second portion about the pivot means and against the resilient means to obtain the predetermined position of the welding gun relative to the workpiece.

2. In a welding machine, the combination of a frame, supporting means,
   a welding gun attached to the supporting means for movement therewith,
   motor means connected with the frame and the supporting means for moving the supporting means and the welding gun toward and away from a workpiece,
   the supporting means comprising a first portion connected with the motor means, a second portion attached to the welding gun pivot means interconnecting the first and second portions, and resilient means for biasing the second portion about the pivot means,
   and means for guiding the welding gun to a predetermined position relative to an edge of the workpiece comprising an indexing member rigidly mounted on the second portion and having cam means projecting beyond the end of the welding gun for engaging the edge of the workpiece as the welding gun is moved toward the workpiece and for pivoting the second portion about the pivot means to obtain the predetermined position of the welding gun relative to the workpiece.

3. In a welding machine the combination of stationary means for supporting a workpiece,
   a frame,
   supporting means,
   a welding gun connected with the supporting means for movement therewith,
   motor means connected with the frame and the supporting means for moving the supporting means and the welding gun toward and away from the workpiece,
   the supporting means comprising a first portion connected with the motor means, a second portion attached to the welding gun, pivot means interconnecting the portions, and resilient means for biasing the second portion about the pivot means,
   the second portion having adjustment means pivotal about an axis at right angles to the axis of the pivot means, and having linear adjustment means including a slide means for carrying the welding gun,
   and means for guiding the welding gun to a predetermined position relative to an edge of the workpiece comprising an indexing member rigidly mounted on the second portion and having cam means projecting beyond the end of the welding gun for engaging the edge of the workpiece as the welding gun is moved toward the workpiece and for pivoting the second portion about the pivot means and against the resilient means to obtain the predetermined position of the welding gun relative to the workpiece.

References Cited
UNITED STATES PATENTS

| | | | |
|---|---|---|---|
| 2,441,748 | 5/1948 | Black | 219—124 |
| 2,660,655 | 11/1953 | Powell | 219—86 |
| 2,727,122 | 12/1955 | Gartner | 219—86 |
| 2,833,911 | 5/1958 | Fetz | 219—89 |
| 2,879,373 | 3/1959 | Fagge | 219—89 |
| 3,115,570 | 12/1963 | Denzler et al. | 219—86 |
| 3,118,052 | 1/1964 | Lippart et al. | 219—125 |
| 3,217,204 | 11/1965 | Nance | 219—125 |
| 3,348,018 | 10/1967 | Wood | 219—86 |

RICHARD M. WOOD, *Primary Examiner.*

W. D. BROOKS, *Assistant Examiner.*